United States Patent
Wu et al.

(10) Patent No.: US 12,550,058 B2
(45) Date of Patent: Feb. 10, 2026

(54) METHODS AND DEVICES FOR DISCONTINUOUS TRANSMISSION OR DISCONTINUOUS RECEPTION

(71) Applicant: NOKIA TECHNOLOGIES OY, Espoo (FI)

(72) Inventors: Chunli Wu, Beijing (CN); Samuli Heikki Turtinen, Ii (FI); Jarkko Tuomo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/194,173

(22) Filed: Apr. 30, 2025

(65) Prior Publication Data

US 2025/0261107 A1    Aug. 14, 2025

Related U.S. Application Data

(63) Continuation of application No. PCT/CN2022/129592, filed on Nov. 3, 2022.

(51) Int. Cl.
*H04W 52/02* (2009.01)
*H04W 76/28* (2018.01)

(52) U.S. Cl.
CPC ... *H04W 52/0216* (2013.01); *H04W 52/0235* (2013.01); *H04W 76/28* (2018.02)

(58) Field of Classification Search
CPC ......... H04W 52/0216; H04W 52/0235; H04W 76/28
See application file for complete search history.

(56) References Cited

U.S. PATENT DOCUMENTS

| | | | |
|---|---|---|---|
| 2015/0359034 A1* | 12/2015 | Kim | H04W 76/28 370/328 |
| 2016/0366645 A1* | 12/2016 | Song | H04W 52/0229 |
| 2020/0036430 A1 | 1/2020 | Kim et al. | |
| 2022/0116876 A1 | 4/2022 | Sun et al. | |
| 2022/0191966 A1 | 6/2022 | Wang | |

(Continued)

FOREIGN PATENT DOCUMENTS

| | | |
|---|---|---|
| WO | WO 2021/141475 A1 | 7/2021 |
| WO | WO 2024/000601 A1 | 1/2024 |

(Continued)

OTHER PUBLICATIONS

"3rd Generation Partnership Project; Technical Specification Group Radio Access Network; Study on network energy savings for NR (Release 18)", 3GPP TR 38.864 v0.2.0, (Oct. 2022), 16 pages.

(Continued)

Primary Examiner — Ayanah S George
(74) Attorney, Agent, or Firm — ALSTON & BIRD LLP

(57) ABSTRACT

Embodiments of the present disclosure relate to methods and devices for discontinuous transmission or discontinuous reception. A terminal device receives a DTX or DRX configuration indicating configuration information on a DTX or DRX mode of the network device. The terminal device monitors a downlink transmission or performs an uplink transmission based on one or more conditions regardless of the cell DTX or DRX configuration. In this way, an improved solution for communication on the DTX or DRX mode may be provided, which may meet certain services with low latency requirement.

18 Claims, 9 Drawing Sheets

(56) References Cited

U.S. PATENT DOCUMENTS

| | | |
|---|---|---|
| 2023/0038037 A1 | 2/2023 | Jang et al. |
| 2024/0107444 A1* | 3/2024 | Hu .................. H04W 76/28 |

FOREIGN PATENT DOCUMENTS

| | | | | |
|---|---|---|---|---|
| WO | WO-2024036444 A1 * | 2/2024 | ............ | H04W 76/28 |
| WO | WO 2024/079097 A1 | 4/2024 | | |

OTHER PUBLICATIONS

Apple, "Further discussion on NW DTX / DRX", 3GPP TSG RAN WG2 Meeting #119b-e, R2-2209757, (Oct. 10-19, 2022), 4 pages.

Ericsson, "BSR over 2-step RA", 3GPP TSG-RAN WG2 #109 electronic, Tdoc R2-2000390, (Feb. 24-Mar. 6, 2020), 4 pages.

Ericsson, "Further aspects on NW DTX/DRX", 3GPP TSG-RAN WG2 #119-bis-e, R2-2210253, (Oct. 10-19, 2022), 3 pages.

Huawei et al., "Report of [POST119bis][303][NES] TP on NW DTX/DRX (Huawei/Apple)", 3GPP TSG-RAN WG2 Meeting #119bis-e, R2-2211066, (Oct. 10-19, 2022), 19 pages.

Huawei et al., "TP on Cell DTX DRX to TR 38.864", R2-2211067, (Oct. 21, 2022), 10 pages.

Huawei, "New SI: Study on network energy savings for NR", 3GPP TSG RAN Meeting #94e, RP-213554, (Dec. 6-17, 2021), 5 pages.

Intel Corporation, "Discussion Summary #5 for energy saving techniques of NW energy saving SI", 3GPP TSG RAN WG1 Meeting #110-bis-e, R1-2210744, (Oct. 10-19, 2022), 96 pages.

International Search Report and Written Opinion for Patent Cooperation Treaty Application No. PCT/CN2022/129592 dated Jun. 29, 2023, 7 pages.

LG Electronics, "Discussion on physical layer techniques for network energy savings", 3GPP TSG RAN WG1 #109-e, R1-2204629, (May 9-20, 2022), 6 pages.

NEC, "Discussion on network energy saving techniques", 3GPP TSG RAN WG1 #110, R1-2206242, (Aug. 22-26, 2022), 5 pages.

OPPO, "Discussion on network energy savings", 3GPP TSG-RAN WG2 #119bis-e, R2-2210019, (Oct. 2022), 4 pages.

Qualcomm Incorporated, "Network energy saving techniques", 3GPP TSG-RAN WG3 Meeting #119-bis electronic, R2-2210369, (Oct. 10-19, 2022), 5 pages.

Samsung, "Resource Adaptation for NES", 3GPP TSG-RAN WG2 Meeting #119bis-e, R2-2210613, (Oct. 10-19, 2022), 4 pages.

Vivo, "Discussions on network energy saving techniques", 3GPP TSG RAN WG1 #110bis-e, R1-2208655, (Oct. 10-19, 2022), 23 pages.

* cited by examiner

METHODS AND DEVICES FOR DISCONTINUOUS TRANSMISSION OR DISCONTINUOUS RECEPTION

CROSS-REFERENCE TO RELATED APPLICATIONS

This application is a continuation of International Application No. PCT/CN2022/129592, filed Nov. 3, 2022, the entire contents of which are incorporated herein by reference.

FIELD

Various example embodiments relate to the field of telecommunication and in particular, to methods, devices, apparatuses and a computer readable storage medium for discontinuous transmission (DTX) or discontinuous reception (DRX), in particularly, for cell specific DTX or DRX.

BACKGROUND

In the communication technology, there is a constant evolution ongoing in order to provide efficient and reliable solutions for utilizing wireless communication networks. Currently efforts have been made to develop 5th generation (5G) or 5G advance wireless system. The new wireless systems can support various types of service applications for terminal devices.

In 5G system, wireless communication networks may use discontinuous transmission (DTX) and discontinuous reception (DRX) modes to communicate with certain terminal devices for applications that do not require continuous reception, for example, for extended reality enhancement. The DTX/DRX modes may provide power conservation in network and terminal devices. However, such DTX/DRX mode, in particularly cell specific DTX/DRX, might have some impacts to the current system.

SUMMARY

In general, example embodiments of the present disclosure provide a solution for communication with a low latency.

In a first aspect, there is provided a terminal device. The terminal device may comprise one or more processor and one or more transceivers communicatively coupled to the one or more processor, wherein the one or more processor are configured to: receive, from a network device, a discontinuous transmission (DTX) configuration, wherein the DTX configuration indicates configuration information on a DTX mode of the network device; and monitor a downlink transmission from the network device based on one or more conditions regardless of the DTX configuration.

In a second aspect, there is provided a terminal device. The terminal device may comprise one or more processor and one or more transceivers communicatively coupled to the one or more processor, wherein the one or more processor are configured to: receive, from a network device, a discontinuous reception (DRX) configuration, wherein the DRX configuration indicates configuration information on a DRX mode of the network device; and perform an uplink transmission based on one or more conditions regardless of the DRX configuration.

In a third aspect, there is provided a network device. The network device may comprise one or more processor and one or more transceivers communicatively coupled to the one or more processor, wherein the one or more processor are configured to: transmit, to a terminal device, a discontinuous transmission (DTX) configuration, wherein the DTX configuration indicates configuration information on a DTX mode of the network device; and perform a downlink transmission to the terminal device based on one or more conditions regardless of the DTX configuration.

In a fourth aspect, there is provided a network device. The network device may comprise one or more processor and one or more transceivers communicatively coupled to the one or more processor, wherein the one or more processor are configured to: transmit, to a terminal device, a discontinuous reception (DRX) configuration, wherein the DRX configuration indicates configuration information on a DRX mode of the network device; and monitor an uplink transmission from the terminal device based on one or more conditions regardless of the DRX configuration.

In a fifth aspect, there is provided a method at a terminal device. The method may comprise: receiving, from a network device, a discontinuous transmission (DTX) configuration, wherein the DTX configuration indicates configuration information on a DTX mode of the network device; and monitoring a downlink transmission from the network device based on one or more conditions regardless of the DTX configuration.

In a sixth aspect, there is provided a method at a terminal device. The method may comprise: receiving, from a network device, a discontinuous reception (DRX) configuration, wherein the DRX configuration indicates configuration information on a DRX mode of the network device; performing an uplink transmission based on one or more conditions regardless of the DRX configuration.

In a seventh aspect, there is provided a method at a network device. The method may comprise: transmitting, to a terminal device, a discontinuous transmission (DTX) configuration, wherein the DTX configuration indicates configuration information on a DTX mode of the network device; and performing a downlink transmission to the terminal device based on one or more conditions regardless of the DTX configuration.

In an eighth aspect, there is provided a method at a network device. The method may comprise: transmitting, to a terminal device, a discontinuous reception (DRX) configuration, wherein the DRX configuration indicates configuration information on a DRX mode of the network device; and monitoring an uplink transmission from the terminal device based on one or more conditions regardless of the DRX configuration.

In a ninth aspect, there is provided an apparatus of a terminal device. The apparatus may comprise: means for receiving, from a network device, a discontinuous transmission (DTX) configuration, wherein the DTX configuration indicates configuration information on a DTX mode of the network device; and means for monitoring a downlink transmission from the network device based on one or more conditions regardless of the DTX configuration.

In a tenth aspect, there is provided an apparatus of a terminal device. The apparatus may comprise: means for receiving, from a network device, a discontinuous reception (DRX) configuration, wherein the DRX configuration indicates configuration information on a DRX mode of the network device; and means for performing an uplink transmission based on one or more conditions regardless of the DRX configuration.

In an eleventh aspect, there is provided an apparatus of a network device. The apparatus may comprise: means for transmitting, to a terminal device, a discontinuous transmission (DTX) configuration, wherein the DTX configuration indicates configuration information on a DTX mode of the network device; and means for performing a downlink transmission to the terminal device based on one or more conditions regardless of the DTX configuration.

In a twelfth aspect, there is provided an apparatus of a network device. The apparatus may comprise: means for transmitting, to a terminal device, a discontinuous reception (DRX) configuration, wherein the DRX configuration indicates configuration information on a DRX mode of the network device; and means for monitoring an uplink transmission from the terminal device based on one or more conditions regardless of the DRX configuration.

In a fourteenth aspect, there is provided a terminal device. The terminal device may comprise at least one processor; and at least one memory including computer program codes, wherein the at least one memory and the computer program codes are configured to, with the at least one processor, cause the terminal device to: receive, from a network device, a discontinuous transmission, DTX, configuration, wherein the DTX configuration indicates configuration information on a DTX mode of the network device; and monitor a downlink transmission from the network device based on one or more conditions regardless of the DTX configuration.

In a fifteenth aspect, there is provided a terminal device. The terminal device may comprise at least one processor; and at least one memory including computer program codes, wherein the at least one memory and the computer program codes are configured to, with the at least one processor, cause the terminal device to: receive, from a network device, a discontinuous reception, DRX, configuration, wherein the DRX configuration indicates configuration information on a DRX mode of the network device; and perform an uplink transmission based on one or more conditions regardless of the DRX configuration.

In a sixteenth aspect, there is provided a network device. The network device may comprise at least one processor; and at least one memory including computer program codes, wherein the at least one memory and the computer program codes are configured to, with the at least one processor, cause the network device to: transmit, to a terminal device, a discontinuous transmission, DTX, configuration, wherein the DTX configuration indicates configuration information on a DTX mode of the network device; and perform a downlink transmission to the terminal device based on one or more conditions regardless of the DTX configuration.

In a seventeenth aspect, there is provided a network device. The network device may comprise at least one processor; and at least one memory including computer program codes, wherein the at least one memory and the computer program codes are configured to, with the at least one processor, cause the network device to: transmit, to a terminal device, a discontinuous reception, DRX, configuration, wherein the DRX configuration indicates configuration information on a DRX mode of the network device; and monitor an uplink transmission from the terminal device based on one or more conditions regardless of the DRX configuration.

In an eighteenth aspect, there is provided a non-transitory computer readable medium comprising program instructions for causing an apparatus to perform at least the method according to any one of the above fifth to eighth aspect.

In a nineteenth aspect, there is provided an apparatus comprising means for: receiving, from a network device, a discontinuous transmission (DTX) configuration, wherein the DTX configuration indicates configuration information on a DTX mode of the network device; and monitoring a downlink transmission from the network device based on one or more conditions regardless of the DTX configuration.

In a twentieth aspect, there is provided an apparatus comprising means for: receiving, from a network device, a discontinuous reception (DRX) configuration, wherein the DRX configuration indicates configuration information on a DRX mode of the network device; performing an uplink transmission based on one or more conditions regardless of the DRX configuration.

In a twenty-first aspect, there is provided an apparatus comprising means for: transmitting, to a terminal device, a discontinuous transmission (DTX) configuration, wherein the DTX configuration indicates configuration information on a DTX mode of the network device; and performing a downlink transmission to the terminal device based on one or more conditions regardless of the DTX configuration.

In a twenty-second aspect, there is provided an apparatus comprising means for: transmitting, to a terminal device, a discontinuous reception (DRX) configuration, wherein the DRX configuration indicates configuration information on a DRX mode of the network device; and monitoring an uplink transmission from the terminal device based on one or more conditions regardless of the DRX configuration.

In a twenty-third aspect, there is provided a computer program comprising instructions, which, when executed by an apparatus, cause the apparatus at least to: receive, from a network device, a discontinuous transmission (DTX) configuration, wherein the DTX configuration indicates configuration information on a DTX mode of the network device; and monitor a downlink transmission from the network device based on one or more conditions regardless of the DTX configuration.

In a twenty-fourth aspect, there is provided a computer program comprising instructions, which, when executed by an apparatus, cause the apparatus at least to: receive, from a network device, a discontinuous reception (DRX) configuration, wherein the DRX configuration indicates configuration information on a DRX mode of the network device; and performing an uplink transmission based on one or more conditions regardless of the DRX configuration.

In a twenty-fifth aspect, there is provided a computer program comprising instructions, which, when executed by an apparatus, cause the apparatus at least to: transmit, to a terminal device, a discontinuous transmission (DTX) configuration, wherein the DTX configuration indicates configuration information on a DTX mode of the network device; and perform a downlink transmission to the terminal device based on one or more conditions regardless of the DTX configuration.

In a twenty-sixth aspect, there is provided a computer program comprising instructions, which, when executed by an apparatus, cause the apparatus at least to: transmit, to a terminal device, a discontinuous reception (DRX) configuration, wherein the DRX configuration indicates configuration information on a DRX mode of the network device; and monitor an uplink transmission from the terminal device based on one or more conditions regardless of the DRX configuration.

In a twenty-seventh aspect, there is provided a terminal device. The terminal device may comprise: receiving circuitry configured to receive, from a network device, a discontinuous transmission (DTX) configuration, wherein the DTX configuration indicates configuration information on a DTX mode of the network device; and monitoring circuitry configured to monitor a downlink transmission from the network device based on one or more conditions regardless of the DTX configuration.

In a twenty-eighth aspect, there is provided a terminal device. The terminal device may comprise: receiving circuitry configured to receive, from a network device, a discontinuous reception (DRX) configuration, wherein the DRX configuration indicates configuration information on a DRX mode of the network device; and monitoring circuitry configured to perform an uplink transmission based on one or more conditions regardless of the DRX configuration.

In a twenty-ninth aspect, there is provided a network device. The network device may comprise: transmitting circuitry configured to transmit, to a terminal device, a discontinuous transmission (DTX) configuration, wherein the DTX configuration indicates configuration information on a DTX mode of the network device; and performing circuitry configured to perform a downlink transmission to the terminal device based on one or more conditions regardless of the DTX configuration.

In a thirtieth aspect, there is provided a network device. The network device may comprise: transmitting circuitry configured to transmit, to a terminal device, a discontinuous reception (DRX) configuration, wherein the DRX configuration indicates configuration information on a DRX mode of the network device; and monitoring circuitry configured to monitor an uplink transmission from the terminal device based on one or more conditions regardless of the DRX configuration.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
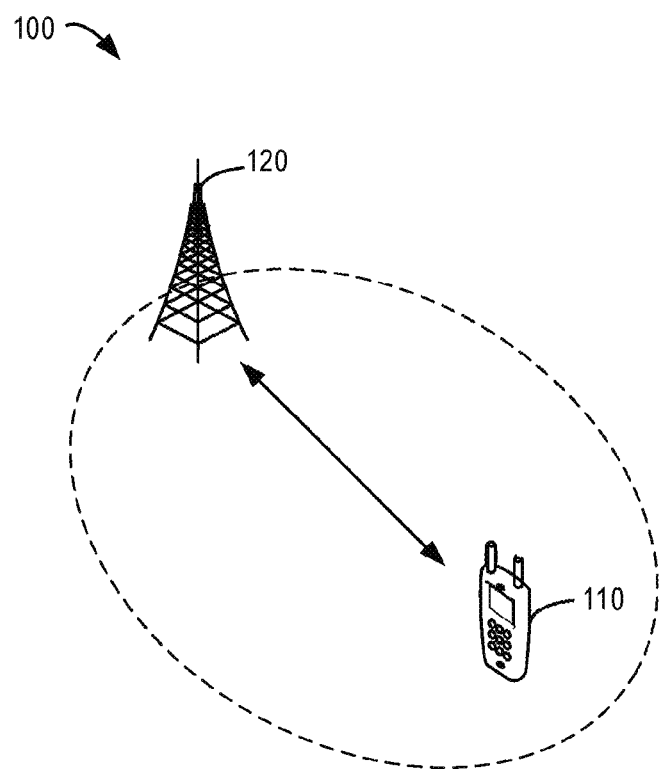
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G), or the further sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a Mobile Station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the 5G system, it is proposed to further improve network energy savings on network device side in terms of both BS transmission and reception, such as network energy saving techniques in time, frequency, spatial, or power domains. These techniques may focus on how to achieve more efficient operation dynamically and/or semi-statically and achieve finer granularity adaptation of transmissions and/or receptions with potential support/feedback from UE and potential UE assistance information.

Currently, it was also proposed to enable wireless devices to make use of discontinuous transmission (DTX) and/or discontinuous reception (DRX), particularly to save battery life but also to help reduce network congestion. A cell DTX/DRX configuration, which indicates configuration information on a DTX/DRX mode of the network, may impact at least terminal devices in RRC_CONNECTED, RRC_IDLE, or RRC_INACTIVE state. The cell DTX/DRX configuration may be specific to a cell that serves a terminal device, specific to a beam of a cell, specific to a cell group that comprises of multiple cells, or specific to a UE.

A periodic cell DTX/DRX may be configured by the network via radio resource control, RRC, signaling. For example, the sleeping pattern can be informed to the UE with dedicated or common signaling. Thus, the network device may perform a downlink transmission or an uplink reception during active periods, and may enter a power saving mode during non-active periods. The cell DTX mode/configuration may also be indicated to the terminal device via for example layer 1 or layer 2 (L1/L2) signaling dynamically. The dynamic L1/L2 signaling at least supports indication dedicated to the terminal device. The dedicated signaling may be signaling to a specific UE, for example, via an RRC signaling, an medium access control, MAC, control element, CE, or L1 signaling (i.e., a physical layer). The common signaling may be signaled to multiple UEs (e.g., UEs within a coverage area of a specific cell), for example, via a system information broadcast.

The inventors notice that in the case when the network device is in the energy saving mode with infrequent transmission and reception, a terminal device might still have requirements on uplink and downlink transmission, especially those with a low latency requirement. In such a case, an unacceptable delay might be caused in the DTX/DRX mode of the network device. A downlink transmission may also be affected similarly.

According to embodiments of the present disclosure, there is provided a solution for flexible communication with low latency. In this solution, a terminal device receives from a network device, a DTX/DRX configuration indicating configuration information on a DTX/DRX mode of the network device. The terminal device then monitors a downlink transmission or performs an uplink transmission based on one or more conditions regardless of the DTX/DRX configuration.

Such conditions may take precedence over the DTX/DRX configuration or cause a transmission/reception to be performed regardless of the DTX/DRX configuration. When these conditions is satisfied or be triggered, the terminal device may perform the downlink reception or an uplink transmission ignoring the DTX/DRX configuration. As such, a flexible solution for transmission and reception in the DTX/DRX mode of the network device is provided, which may provide a higher system performance by for example providing certain services with low latency requirement even in the DTX/DRX mode.

Principle and embodiments of the present disclosure will be described in detail below with reference to the accompanying drawings. However, it is to be noted that these embodiments are illustrated as examples and not intended to limit scope of the present application in any way.

Reference is made to FIG. 1, which illustrates an example communication system 100 in which embodiments of the present disclosure may be implemented. As shown in FIG. 1, the communication system 100 may include a terminal device 110 and a network device 120. In some embodiments, the network device 120 may provide a serving cell (also referred to as a cell herein) as schematically illustrated by the dashed line ellipse, and the terminal device 110 may be located in the cell and served by the network device 120.

It is to be understood that the number of devices or cells in FIG. 1 is given for the purpose of illustration without suggesting any limitations to the present disclosure. The communication system 100 may include any suitable number of network devices and/or terminal devices and/cells adapted for implementing embodiments of the present disclosure. Although not shown, it would be appreciated that one or more terminal devices may be located in the environment 100.

As shown in FIG. 1, the terminal device 110 may communicate with the network device 120 via a channel such as a wireless communication channel. The communications in the communication system 100 may conform to any suitable standards including, but not limited to, long term evolution (LTE), LTE-evolution, LTE-advanced (LTE-A), new radio (NR), wideband code division multiple access (WCDMA), code division multiple access (CDMA) and the like. The embodiments of the present disclosure may be performed according to any generation communication protocols either currently known or to be developed in the future. Examples of the communication protocols include, but not limited to, the third generation (3G), the fourth generation (4G), 4.5G, the fifth generation (5G) communication protocols, 5.5G, 5G-Advanced networks, or the sixth generation (6G) networks.

Communication in a direction from the terminal device 110 towards the network device 120 is referred to as UL communication, while communication in a reverse direction from the network device 120 towards the terminal device 110 is referred to as DL communication. The wireless communication channel may comprise a physical uplink control channel (PUCCH), a physical uplink shared channel (PUSCH), a physical random-access channel (PRACH), a physical downlink control channel (PDCCH), a physical downlink shared channel (PDSCH), and a physical broadcast channel (PBCH).

In some embodiments, the terminal device 110 may transmit UL data to the network device 120 via a UL data channel transmission. For example, the UL data channel transmission may be a physical uplink shared channel (PUSCH) transmission. Of course, any other suitable forms are also feasible.

In some embodiments, the terminal device 110 may receive DL data from the network device 120 via a DL data channel transmission. For example, the DL data channel transmission may be a physical downlink shared channel (PDSCH) transmission. Of course, any other suitable forms are also feasible.

In some embodiments, the terminal device 110 may receive, from the network device 120, downlink control information (DCI) via a DL control channel transmission. For example, the DL control channel transmission may be a PDCCH transmission. Of course, any other suitable forms are also feasible.

In some embodiments, the terminal device 110 may transmit uplink control information (UCI), e.g., HARQ feedback information, to the network device 120 via an UL control channel transmission. For example, the UL control channel transmission may be a PUCCH transmission. Of course, any other suitable forms are also feasible.

In some embodiments, the terminal device 110 receives from a network device, a DTX/DRX configuration indicating configuration information on a DTX/DRX mode of the network device. The terminal device then monitors a downlink transmission or performs an uplink transmission based on one or more conditions regardless of the DTX/DRX configuration.

Figure 2:
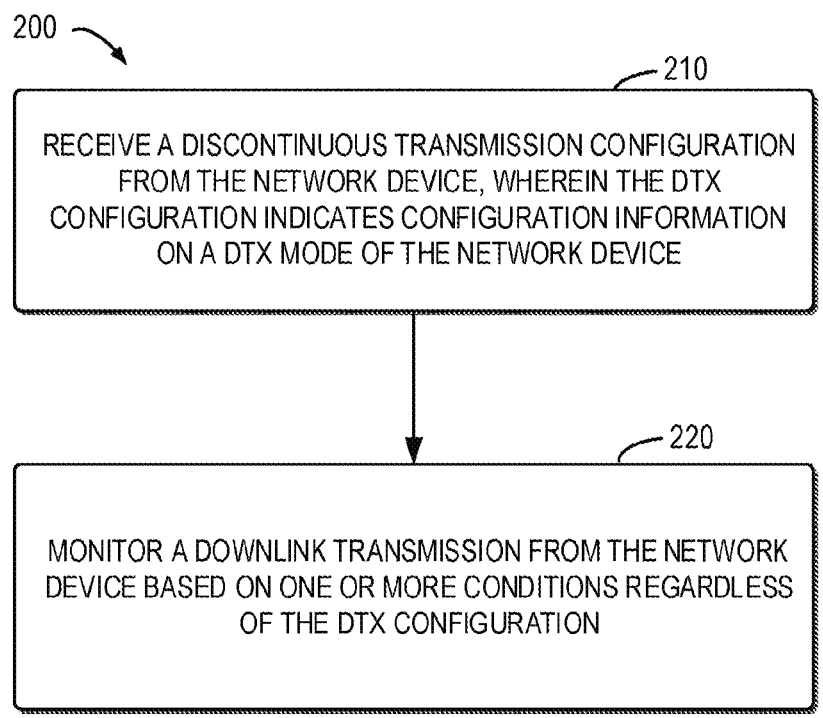
FIG. 2 illustrates an example flowchart of a method implemented at a terminal device according to some embodiments of the present disclosure.

FIG. 2 illustrates an example flowchart of a method 200 implemented at a terminal device according to some embodiments of the present disclosure. The method 200 is a method for DL reception in DTX mode of the network device, which is implemented at the terminal device. For the purpose of discussion, the method 200 will be described from the perspective of the terminal device 110 with reference to FIG. 1. It is to be understood that method 200 may further include additional blocks not shown and/or omit some shown blocks, and the scope of the present disclosure is not limited in this regard.

At block 210, the terminal device 110 receives a discontinuous transmission, (DTX) configuration from the network device 120, wherein the DTX configuration indicates configuration information on a DTX mode of the network device.

In some embodiments, the DTX configuration may indicate the sleeping mode of the network device. For example, it may include DTX parameters such as the length of a DTX period, the duty cycle and the start of a DTX period. For another example, it may further include PDCCH occasions which the terminal device should not monitor. By such information, the terminal device may know when the network device performs DL downlink transmission and when it is sleeping. In some embodiments, the DTX mode configuration may comprise a DTX mode configuration for any of a cell, a beam, a cell group, or a terminal device.

In some embodiments, the terminal device 110 could have periodic CSI-RS/PDCCH occasions configured from the network device 120, and it may perform DL reception by following the common DTX mode. In other words, these CSI-RS/PDCCH occasions will be transmitted when the network device is active and thus the terminal device 110 may monitor/measure these occasions only when the network device 120 is active for the terminal device 110 with DTX mode configuration. In some examples, the RS occasions may be any other RS than CSI-RS occasions.

At block 220, the terminal device 110 monitors a downlink transmission from the network device 120 based on one or more conditions regardless of the DTX configuration. In other words, the terminal device 110 monitors the downlink transmission based on one or more conditions regardless of the DTX configuration. For example, even though the DTX configuration indicates that the network device 120 is in DTX period, the terminal device 110 still monitors for a downlink transmission if any of the conditions is met or triggered.

In embodiments of the present disclosure, there is proposed a method to set one or more conditions for the downlink reception and these conditions will take precedence over the DTX configuration. In other word, if any of these conditions is met, the terminal device will ignore the DTX configuration and transmit the message as usual. In some embodiments, the one or more conditions may comprise a set of predetermined conditions for the downlink reception.

In some embodiments, the one or more conditions may comprise one or more of the following: a random access response (RAR) reception window is running; a timer for contention resolution is running; a message B (MSGB) response window in a two-step random access procedure is running; a buffer status report (BSR) is transmitted; a scheduling request (SR) is transmitted; or a system information window is running for terminal device to receive one or more types of system information.

In some embodiments, the terminal device 110 may further obtain a condition configuration which indicates the one or more conditions for the downlink reception. In some embodiments, the downlink condition configuration may be received from the network device 120. Additionally or alternatively the downlink condition configuration may be predefined by a communication protocol.

In some embodiments, the terminal device may monitor a physical downlink control channel, PDCCH for RAR during the reception window of RAR. Additionally or alternatively, the terminal device may monitor a PDCCH for MSGB or a fallback RAR during the reception window of MSGB. Additionally or alternatively, the terminal device may monitor a PDCCH during the timer for contention resolution is running.

Figure 6A:
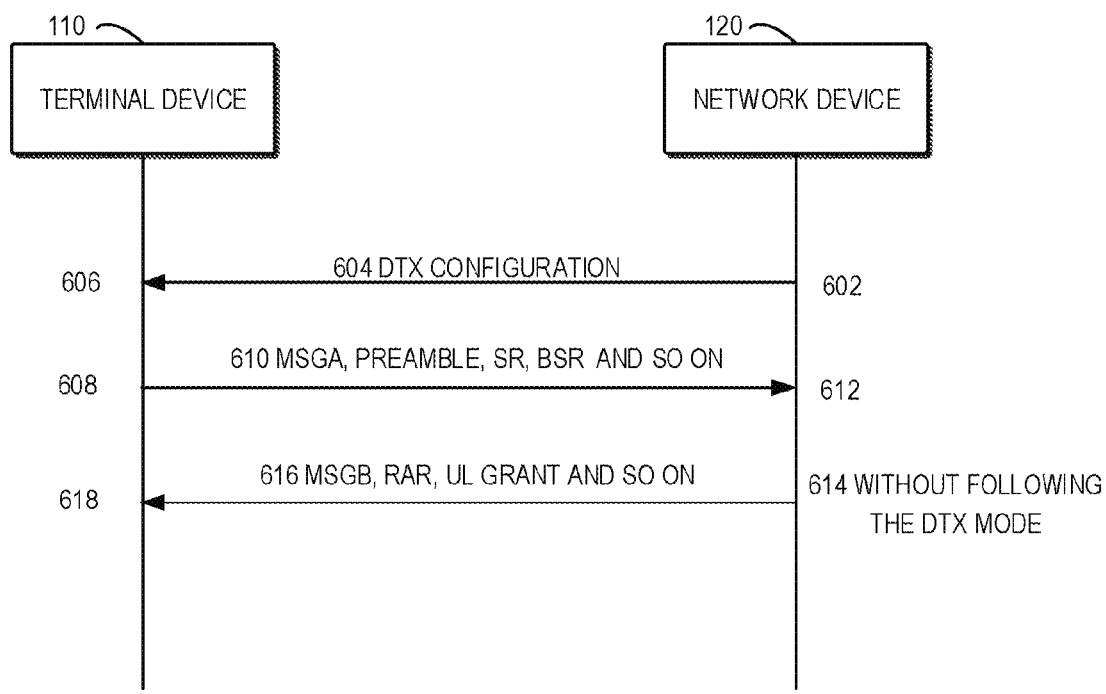
FIGS. 6A and 6B illustrates an example communication process according to some embodiments of the present disclosure.

Some details will be described blow with reference to FIG. 6A. As shown in FIG. 6, the network device 120 transmits 602 a DTX configuration 604. Accordingly, the terminal device 110 receives 606 the DTX configuration 604. Then, the terminal device 110 may transmit 608 MSGA, SR, or BSR 610, which may follow the DRX configuration of the network device. Alternatively or additionally, one or more of the uplink transmission may be transmitted based on a set of uplink transmission conditions which ignores the DRX configuration of the network device.

Accordingly, after the network device 120 receives 612 the MSGA, SR, or BSR 610, it may transmit 614 an MSGB/fallback RAR, RAR, uplink grant, downlink assignment, or SI 616 for DL transmission without following the DTX mode. Accordingly, due to the exceptional conditions, the terminal device 110 will also monitor 618 the DL transmission even during the sleeping time of the network according to the DTX configuration.

As an example, in a contention-based random access process, the terminal device 110 may randomly select a preamble sequence from a preamble sequence resource pool and transmit 608 the preamble sequence to the network device 120. The preamble transmission may follow the DRX mode or uplink transmission conditions where the network device 120 is actually monitoring for the UL transmission from the terminal device. In other words, the terminal device 110 may only consider random access occasions not conflicting with the DRX mode as valid to transmit the preamble.

However, it is expected for the network device 120 to respond as soon as possible. After receiving 612 the random access request 610, the network device 120 may transmit 614 a random access response (RAR) 616 as a response to the random access request to the terminal device 110 without following the DTX mode, Accordingly, the terminal device 110 may monitor PDCCH during a RAR response window regardless of the DTX mode.

After transmitting a preamble sequence, the terminal device 110 may transmit a third message (Msg3) of the random access procedure, which may include, for example, a connection establishment/resume request message, a terminal device identification, buffer status report, and etc., to the network device 120. The network device 120 may then transmit a contention resolution message, i.e. a fourth message (Msg4), to the terminal device 110, so as to complete the contention resolution. Additionally or alternatively, the contention resolution message may also be transmitted by the network device without considering the DTX configuration. Accordingly, the terminal device 110 may monitor PDCCH during the time period when the contention resolution timer is running regardless of the DTX mode.

For another example, a contention-free random access process is initiated, and the network device 120 may similarly transmit 614 an RAR 616 as a response to the random access request to the terminal device 110 without following the DTX mode, Accordingly, the terminal device 110 may monitor PDCCH during a RAR response window regardless of the DTX mode.

As a further example, in a two-step random access process, the terminal device 110 transmits message A (MSGA) to the network device 120. It is also expected for the network device 120 to respond as soon as possible. Upon detecting the MSGA, the network device 120 may transmit a MSGB or a fallback RAR without following the DTX mode. The terminal device 110 may monitor the MSGB or the fallback RAR within the MSGB response window without following the DTX mode.

In some embodiments, the terminal device may monitor the PDCCH only through search space(s)/control resource sets (CORESET(s)) used to receive RAR/MSGB/contention resolution message within the DTX mode. For example, such search space(s) may comprise a random access search space, like ra-SearchSpace. For another example such control resource set may comprise a CORESET zero, like CORESET #0.

In some embodiments, the terminal device may monitor a PDCCH within a predetermined time period after a BSR is transmitted. For example, a BSR is transmitted when an MAC protocol data unit (PDU) is built including a BSR MAC CE, and the MAC PDU is transmitted over an uplink grant, e.g., via PUSCH. In some embodiments, the BSR may indicate data buffered for a certain type of logical channel (LCH) or for a logical channel group (LCG) having a certain type of LCH. More detail will be described blow with reference with FIG. 6A.

In an example, the terminal device 110 may transmit 608 a BSR 610 to the network device 120. It may be also expected for the network device 120 to respond the BSR as soon as possible. Whether to follow the cell DTX mode after the transmission of the BSR may depend on indicated buffered data. For example, if the indicated data is associated with a high priority LCH or LCG including the high priority LCH, the network device may transmit 614 an UL grant without following the DRX mode.

Then the terminal device 110 may monitor 618 PDCCH regardless of the cell DTX mode if the BSR indicates data buffered for a high priority LCH or for an LCG having a high priority LCH (which may or may not have buffered data). The terminal device 110 may still follow the cell DTX mode if the BSR indicates only data buffered for low priority LCH or for an LCG having a low priority LCH (which may or may not have buffered data).

In some embodiments, a high priority LCH may be determined based on types of LCH. For example, certain types of LCH may be determined as high priority LCH. In some embodiments, the high priority LCH could be determined based on a priority threshold (pre-defined or network configured) of the LCH. A LCH with a priority level above or equal to a predetermined threshold may be determined as a high priority LCH and a LCH with a priority level below or equal to the threshold may be determined as a low priority LCH.

In some embodiments, the terminal device 110 may monitor a PDCCH within a predetermined time period after a SR is transmitted, wherein the SR is triggered in association with a BSR triggered by any of a certain type of LCH, or a beam failure recovery, BFR, report. More detail will be described blow with reference with FIG. 6A.

In an example, the terminal device 110 may transmit 608 scheduling request (SR) to the network device 120 for the purpose of receiving an uplink grant. It may be also expected for the network device 120 to respond as soon as possible. Whether to follow the cell DTX mode for response to SR depends on the SR trigger or the buffer status report (BSR) trigger that triggers the SR. For example, if the SR trigger is associated with a high priority LCH or a BFR trigger (e.g., SCell BFR or BFD-RS set failure on SCell/SpCell), the network device may transmit 614 an UL grant without following the DRX mode.

The terminal device 110 may then monitor PDCCH regardless of the DTX mode after such an SR is transmitted. The terminal device 110 may still follow DTX mode for PDCCH monitoring after the SR is transmitted if the SR trigger is, for example, associated with a BSR triggered by a low priority LCH, BFD-RS set failure on SCell, or consistent LBT failure recovery of a SCell. The high priority LCH may be a certain type of LCH or LCH with a priority above or equal to a certain threshold, and a low priority LCH may be other types of LCH or LCHs with a priority below or equal to a certain threshold.

In some embodiments, the DTX configuration is cell-specific and the terminal device 110 may further receive a dedicated signaling of DTX configuration from the network device 120, in which the dedicated signaling indicates a new DTX configuration dedicated to the terminal device which overrides the DTX configuration. There is no need to update the common DTX mode for all the terminal devices, because the monitoring behavior for other terminal devices may not be impacted.

In some embodiments, the terminal device 110 may monitor system information from the network device within a system information window of one or more types of system information. In some embodiments, the one or more types of system information may comprise a predetermined type of system information. In some embodiments, the predetermined type of system information may comprise system information block for public warning system (PWS) message, or earthquake and tsunami warning system (ETWS) message.

With embodiments as proposed herein, the terminal device may be enabled to perform DL monitoring or reception without following the DTX mode of the network device, which may can mitigate or alleviate a negative impact on low latency service when the network device performs a DTX/DRX mode for energy saving, thereby providing an improved system performance and efficient by reducing the potential latency.

Figure 3:
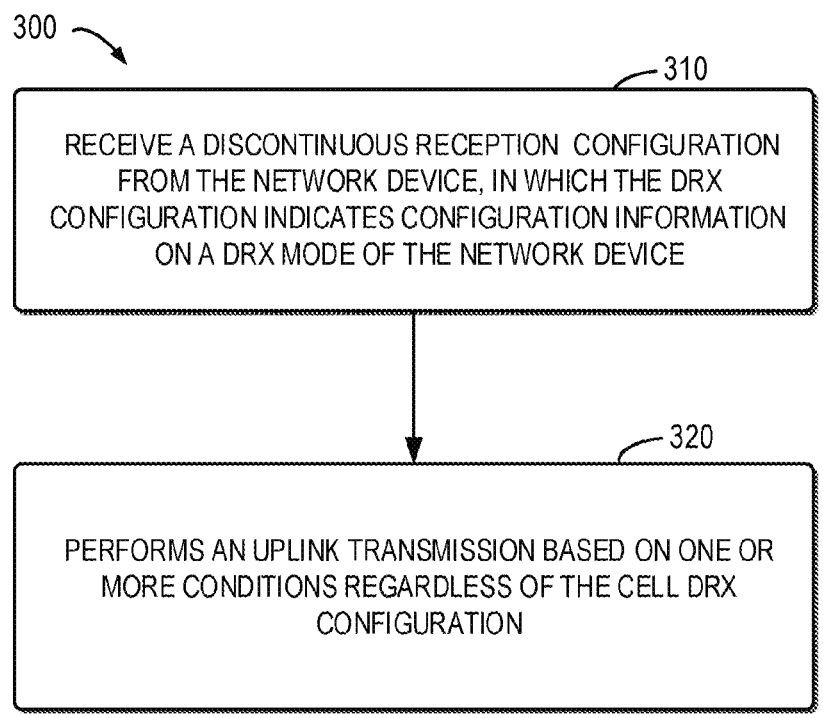
FIG. 3 illustrates an example flowchart of a method implemented at a terminal device according to some embodiments of the present disclosure.

FIG. 3 illustrates an example flowchart of a method 300 implemented at a terminal device according to some embodiments of the present disclosure. The method 300 is a solution for UL transmission in DRX mode of the network device, which is implemented at the terminal device. For the purpose of discussion, the method 300 will be described from the perspective of the terminal device 110 with reference to FIG. 1. It is to be understood that method 300 may further include additional blocks not shown and/or omit some shown blocks, and the scope of the present disclosure is not limited in this regard.

At block 310, the terminal device 110 receives a discontinuous reception (DRX) configuration from the network device 120, in which the DRX configuration indicates configuration information on a DRX mode of the network device 120.

Similarly to the DTX mode, the DRX configuration may indicate the sleeping mode of the network device in uplink reception. For example, it may include DRX parameters such as the length of a DRX period, the duty cycle and the start of a DRX period. For another example, it may further include uplink occasions which the terminal device should not perform a UL transmission. The terminal device may know, by the DRX configuration when the network device monitors UL reception and when it is sleeping. For example, the DRX mode configuration may comprise a DRX mode configuration for any of a cell, a beam, a cell group, or a terminal device.

As an example, for UL transmission, the terminal device 110 may have dedicated RRC configuration of periodic channels state information (CSI) reporting, configured grant (CG), and it may perform UL transmission following the common cell DRX mode, i.e. only perform UL transmission on the configured occasions when the network device 120 is monitoring UL transmissions. The configured grant may include for example semi-persistent transmission or pre-configurated uplink transmission resource.

As another example, for UL transmission with low priority, for example, associated with low priority LCH or LCG with lower priority LCH, the UL transmission may follow the DRX mode of the network device.

At block 320, the terminal device 110 performs an uplink transmission based on one or more conditions regardless of the cell DRX configuration. In other words, the terminal device 110 may preform an UL transmission, regardless of the DTX configuration, when any of the one or more conditions is met.

In some embodiments, the one or more conditions may comprise one or more of the following conditions: channels state information (CSI) reporting; configured grant (CG); buffer failure recovery (BFR) report; and a random channel (RACH) preamble transmission.

In some embodiments, the terminal device 110 may further obtain an uplink condition configuration which indicates the set of predetermined uplink conditions. As an example, the uplink condition configuration can be received from the network device. As another example, the uplink condition configuration can be predefined by a communication protocol.

In an example, the terminal device 110 can decide to follow or not follow the cell DRX mode for different channels/signals, or depend on the mode of the cell DRX. For example, CG/PUSCH does not follow the cell DRX mode as it impacts UL latency, while CSI-RS reporting/SRS follow DRX mode.

As an example, the network device 120 can send dedicated signaling which takes precedence over the common DRX mode, for example, in case that more frequent UL transmission is desired for the network device 120 without updating the common DTX mode. Then, the terminal device 110 performs an uplink transmission according to the dedicated signaling without following the configured cell DRX mode. More detail will be described blow with reference to FIG. 6B.

Figure 6B:
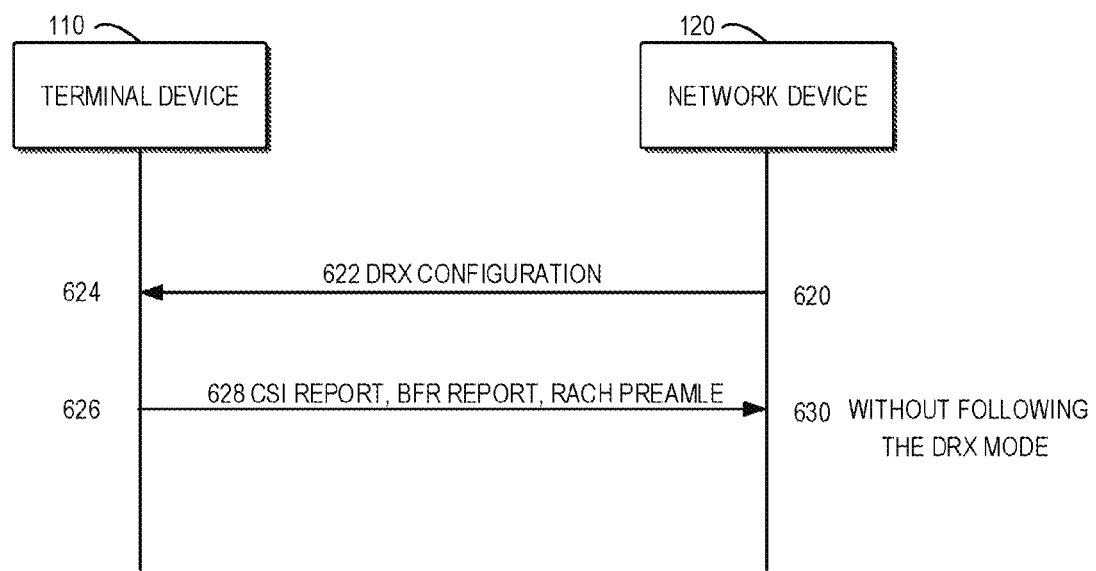

As shown in FIG. 6B, the network device 120 may transmit 620 a cell DRX configuration 622. Accordingly, the terminal device 110 receives 624 the cell DRX configuration 622. For example, the terminal device 110 transmits 626 a CSI-RS report, BFR report, CG, or RACH preamble 628 for UL transmission without following the DRX mode. Accordingly, the network device 120 monitors 630 the UL transmission without following the DRX mode. It should be noted that if the network device 120 supports both DRX and DTX, the DRX and DTX configuration can be transmitted to the terminal device 110 in a same message. The message may be for example a dedicated signaling or a broadcast signaling, and the broadcast signaling may be for example system information.

In some embodiments, the DRX configuration is cell-specific and the terminal device 110 may further receive a dedicated signaling of DRX configuration from the network device 120, in which the dedicated signaling indicates a new DRX configuration dedicated to the terminal device which overrides the DRX configuration. The terminal device 110 will perform uplink transmission with following the new DRX configuration instead of the DRX configuration. There is no need to update the common DRX mode for all the terminal devices, because the behavior for other terminal devices will not be impacted.

In some embodiments, for the implementation of UL transmission, the terminal device 110 may further receive at least one uplink resource configuration. The uplink resource configuration may indicate an uplink transmission resource configured periodically or semi-persistently. The uplink transmission resource may comprise CSI reporting resource, CG resource or both.

Figure 4:
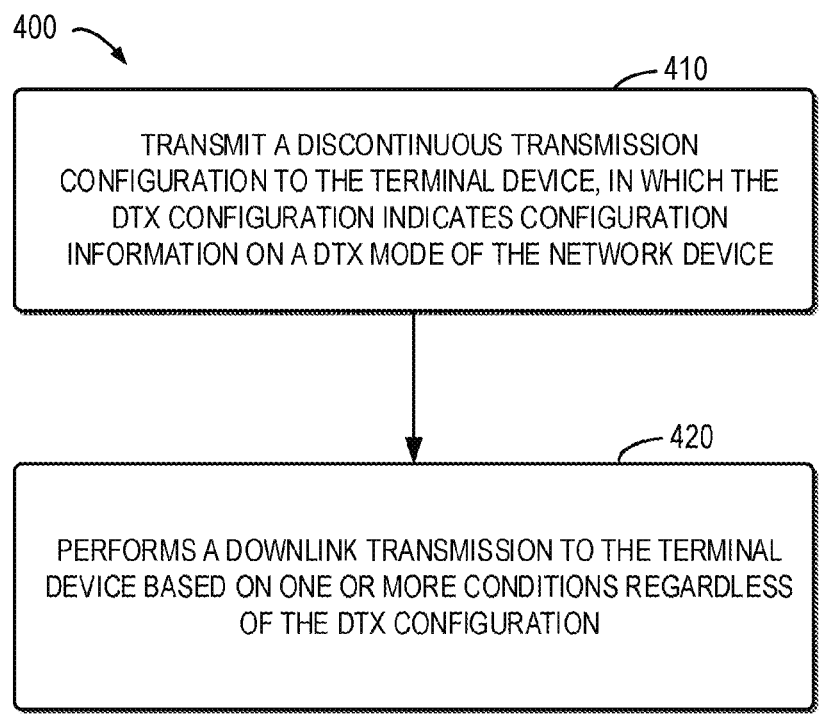
FIG. 4 illustrates an example flowchart of a method implemented at a network device according to some embodiments of the present disclosure.

FIG. 4 illustrates an example flowchart of a method 400 implemented at a network device according to some embodiments of the present disclosure. The method 400 is a solution for DL transmission in DRX mode of the network device, which is performed at the network device. For the purpose of discussion, the method 400 will be described from the perspective of the network device 120 with reference to FIG. 1. It is to be understood that method 400 may further include additional blocks not shown and/or omit some shown blocks, and the scope of the present disclosure is not limited in this regard.

At block 410, the network device 120 transmits a discontinuous transmission (DTX) configuration to the terminal device 110, in which the DTX configuration indicates configuration information on a DTX mode of the network device 120. As described with reference to FIG. 2, the DTX configuration may indicate the sleeping mode of the network device.

For example, it may include DTX parameters such as the length of a DTX period, the duty cycle and the start of a DTX period. By such information, the terminal device may be notified of information on when the network device performs DL downlink transmission and when it is sleeping. The DTX mode configuration may comprise a DTX mode configuration for any of a cell, a beam, or a cell group.

At block 420, the network device 120 performs a downlink transmission to the terminal device 110 based on one or more conditions regardless of the DTX configuration.

In embodiments of the present disclosure, there is proposed to set one or more conditions for the downlink reception and these condition will take precedence over the DTX configuration in the terminal device. In other word, if any of these conditions is met, the terminal device will ignore the DTX configuration and transmit the message as usual. In some embodiments, the one or more conditions may comprise a set of predetermined conditions for the downlink reception.

For the network device, it will perform DL transmission without following the DTX mode in scenarios associated with these conditions to enable prompt DL transmission.

In some embodiments, the DTX configuration may be cell-specific and the network device may further transmit a dedicated signaling of DTX configuration to the terminal device 110, in which the dedicated signaling indicates a new DTX configuration dedicated to the terminal device which overrides the DTX configuration.

In some embodiments, the network device 120 may further transmit a downlink condition configuration which indicates the one or more conditions. The one or more conditions may comprise one or more of the following conditions: a random access response (RAR) reception window is running; a timer for contention resolution is running; a message B (MSGB) response window in a two-step random access procedure is running; a buffer status report (BSR) is transmitted; a scheduling request (SR) is transmitted; or a system information window is running for terminal device to receive one or more types of system information.

In some embodiments, performing the downlink transmission may comprise any of: transmitting the RAR after receiving a RACH preamble; transmitting the MSGB or fallback RAR after receiving a message A (MSGA) in a two-step random access procedure; transmitting a contention resolution message after receiving a contention resolution request.

In some embodiments, performing the downlink transmission may comprise: transmitting an uplink grant on a PDCCH in response to a BSR from the terminal device 110, wherein the BSR indicates data buffered for a certain type of logical channel, LCH, or for a logical channel group, LCG, having a certain type of LCH.

In some embodiments, performing the downlink transmission may comprise: transmitting an uplink grant on a PDCCH in response to an SR from the terminal device 110, wherein the SR is triggered in association with a BSR triggered by any of a certain type of LCH, a LCG having a certain type of LCH, or associated a beam failure recovery, BFR, trigger.

In some embodiments, performing the downlink transmission may further comprise: transmitting system information to the terminal device within system information window of one or more types of system information. The one or more types of system information may comprise a predetermined type of system information, and the predetermined type of system information comprises system information block for public warning system (PWS) message, or earthquake and tsunami warning system (ETWS) message.

Figure 5:
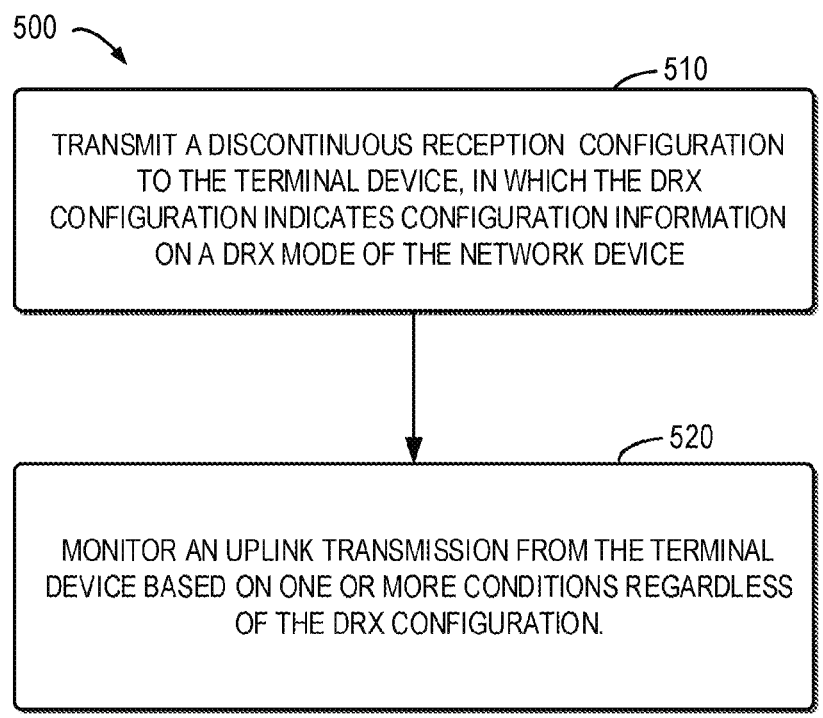
FIG. 5 illustrates an example flowchart of a method implemented at a network device according to some embodiments of the present disclosure.

FIG. 5 illustrates an example flowchart of a method 500 implemented at a network device according to some embodiments of the present disclosure. The method 400 is a solution for UL reception in DRX mode of the network device, which is performed at the network device. For the purpose of discussion, the method 500 will be described from the perspective of the network device 120 with reference to FIG. 1. It is to be understood that method 500 may further include additional blocks not shown and/or omit some shown blocks, and the scope of the present disclosure is not limited in this regard.

At block 510, the network device 120 transmits a discontinuous reception (DRX) configuration to the terminal device 110, in which the DRX configuration indicates configuration information on a DRX mode of the network device.

As described with reference FIG. 3, The DRX configuration may indicate the sleeping mode of the network device in uplink reception. For example, it may include DRX parameters such as the length of a DRX period, the duty cycle and the start of a DRX period. The terminal device may be notified, by the DRX configuration, of information on when the network device monitors UL reception and when it is sleeping. For example, the DRX mode configuration may comprise a DRX mode configuration for any of a cell, a beam, or a cell group.

At block 520, the network device 120 monitors an uplink transmission from the terminal device 110 based on one or more conditions regardless of the DRX configuration.

In some embodiments, the DRX configuration may be cell-specific and the network device may further transmit a dedicated signaling of DRX configuration to the terminal device 110, in which the dedicated signaling indicates a new DRX configuration dedicated to the terminal device which overrides the DRX configuration.

In some embodiments, the network device 120 may further transmit a condition configuration which indicates the one or more conditions. The one or more conditions may comprise one or more of the following conditions: a CSI reporting; CG; a BFR report; and an RACH preamble transmission.

In some embodiments, the network device 120 may further transmit at least one uplink resource configuration, in which the uplink resource configuration indicates an uplink transmission resource configured periodically or semi-persistently. For example, the uplink transmission resource may comprise one or both of CSI reporting resource and CG resource.

It is to be appreciated that hereinabove, operations at the network device are described in short, for simplification purposes. These operations at the network side might be corresponding to those at the terminal device. Therefore, detailed operations about some of operations or features in FIGS. 4 and 5, reference may be made to those contents described above for the terminal device with reference to FIGS. 2 and 3.

In some embodiments, an apparatus capable of performing the method 200 (for example, the terminal device 110) may comprise means for performing the respective steps of the method 200. The means may be implemented in any suitable form. For example, the means may be implemented in a circuitry or software module.

In some embodiments, the apparatus further may comprise means for performing the steps in some embodiments of the method 200. In some embodiments, the means may comprise at least one processor; and at least one memory including computer program code, the at least one memory and computer program code configured to, with the at least one processor, cause the performance of the apparatus.

In some embodiments, the apparatus for performing the method 200 comprises: means for receiving, from a network device, a discontinuous transmission, (DTX) configuration, wherein the DTX configuration indicates configuration information on a DTX mode of the network device; and means for monitoring a downlink transmission from the network device based on one or more conditions regardless of the DTX configuration.

In some embodiments, an apparatus capable of performing the method 300 (for example, the terminal device 110) may comprise means for performing the respective steps of the method 300. The means may be implemented in any suitable form. For example, the means may be implemented in a circuitry or software module.

In some embodiments, the apparatus further may comprise means for performing the steps in some embodiments of the method 300. In some embodiments, the means may comprise at least one processor; and at least one memory including computer program code, the at least one memory and computer program code configured to, with the at least one processor, cause the performance of the apparatus.

In some embodiments, the apparatus for performing the method 300 comprises: means for receiving, from a network device, a discontinuous reception (DRX) configuration, wherein the DRX configuration indicates configuration information on a DRX mode of the network device; and means for performing an uplink transmission based on one or more conditions regardless of the DRX configuration.

In some embodiments, an apparatus capable of performing the method 400 (for example, the network device 120) may comprise means for performing the respective steps of the method 400. The means may be implemented in any suitable form. For example, the means may be implemented in a circuitry or software module.

In some embodiments, the apparatus may further comprise means for performing the steps in some embodiments of the method 400. In some embodiments, the means comprises at least one processor; and at least one memory including computer program code, the at least one memory and computer program code configured to, with the at least one processor, cause the performance of the apparatus.

In some embodiments, the apparatus for performing the method 400 comprises: means for transmitting, to a terminal device, a discontinuous transmission (DTX) configuration, wherein the DTX configuration indicates configuration information on a DTX mode of the network device; and means for performing a downlink transmission to the terminal device based on one or more conditions regardless of the DTX configuration.

In some embodiments, an apparatus capable of performing the method 500 (for example, the network device 120) may comprise means for performing the respective steps of the method 500. The means may be implemented in any suitable form. For example, the means may be implemented in a circuitry or software module.

In some embodiments, the apparatus may further comprise means for performing the steps in some embodiments of the method 500. In some embodiments, the means comprises at least one processor; and at least one memory including computer program code, the at least one memory and computer program code configured to, with the at least one processor, cause the performance of the apparatus.

In some embodiments, the apparatus for performing the method 500 comprises: means for transmitting, to a terminal device, a discontinuous reception (DRX) configuration, wherein the DRX configuration indicates configuration information on a DRX mode of the network device; and means for monitoring an uplink transmission from the terminal device based on one or more conditions regardless of the DRX configuration.

Figure 7:
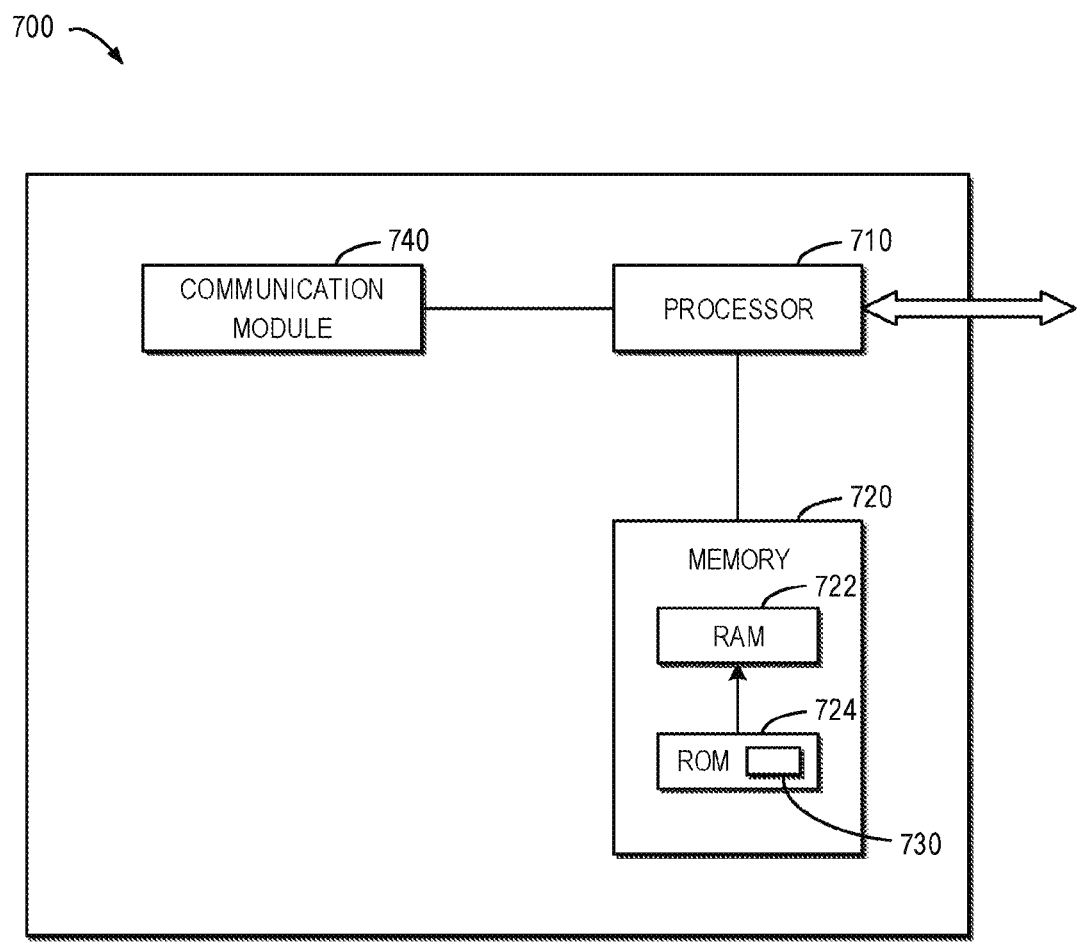
FIG. 7 illustrates an example simplified block diagram of an apparatus that is suitable for implementing embodiments of the present disclosure.
Figure 8:
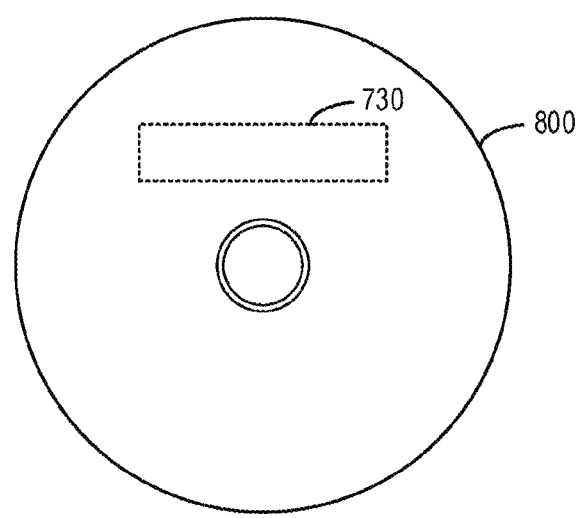
FIG. 8 illustrates an example block diagram of an example computer readable medium in accordance with some embodiments of the present disclosure.

FIG. 7 is a simplified block diagram of a device 700 that is suitable for implementing embodiments of the present disclosure. The device 700 may be provided to implement the communication device, for example the terminal device 110 and the network device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The communication module 740 may include for example one or more transceivers. The one or more transceivers may be coupled with one or more antennas, to wirelessly transmit and receive communication signals. The one or more transceivers allow the communication device to communicate with other devices that may be wired and/or wireless. The transceiver may support one or more radio technologies. For example, the one or more transceivers may include a cellular subsystem, a WLAN subsystem, and/or a Bluetooth™ subsystem. In some examples, the one or more transceivers may include processors, controllers, radios, sockets, plugs, buffers, and like circuits/devices used for connecting to and communication on networks.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 12 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out any of the methods 200 to 500 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
    one or more processors; and
    one or more transceivers communicatively coupled to the one or more processors, wherein the one or more processors are configured, with the one or more transceivers, to cause the terminal device to perform at least:
        receiving, from a network device, a discontinuous transmission (DTX) configuration, wherein the DTX configuration indicates configuration information on a DTX mode of the network device;
        transmitting, to the network device, a scheduling request which follows a discontinuous reception (DRX) configuration of the network device, wherein the scheduling request is associated with a beam failure recovery report; and
        within a predetermined time period after the transmitting the scheduling request, monitoring a physical downlink control channel (PDCCH) from the network device based on one or more conditions regardless of the DTX configuration, wherein the one or more conditions comprises a condition that a scheduling request is transmitted.

2. The terminal device of claim 1, wherein the one or more processors are further configured, with the one or more transceivers, to cause the terminal device to perform:
    receiving, from the network device, the DRX configuration, wherein the DRX configuration indicates configuration information on a DRX mode of the device.

3. The terminal device of claim 2, wherein the DRX configuration and the DTX configuration are received in a same message.

4. The terminal device of claim 1, wherein the DRX configuration includes uplink occasions at which the terminal device should not perform an uplink transmission.

5. The terminal device of claim 1, wherein the one or more processors are further configured, with the at least one transceivers, to cause the terminal device to perform the monitoring the PDCCH transmission from the network device during a sleeping time of the network device, according to the DTX configuration.

6. The terminal device of claim 1, wherein the DTX configuration is specific to a cell that serves the terminal device.

7. The terminal device of claim 1, wherein the one or more processors are further configured, with the at least one transceivers, to cause the terminal device to perform:
    receiving, from the network device, the PDCCH transmission.

8. The terminal device of claim 7, wherein the PDCCH transmission is an uplink grant.

9. A network device comprising:
    one or more processors; and
    one or more transceivers communicatively coupled to the one or more processors, wherein the one or more processors are configured, with the one or more transceivers, to cause the network device to perform at least:
        transmitting, to a terminal device, a discontinuous transmission (DTX) configuration, wherein the DTX configuration indicates configuration information on a DTX mode of the network device;
        receiving, from the terminal device, a scheduling request which follows a discontinuous reception (DRX) configuration of the network device; and
        performing, during a sleeping time of the network device, according to the DTX configuration, a downlink transmission to the terminal device based on one or more conditions regardless of the DTX configuration, wherein the one or more conditions comprises a condition that a scheduling request is transmitted.

10. The network device of claim 9, wherein the one or more processors are further configured, with the one or more transceivers, to cause the network device to perform:
    transmitting, to the terminal device, the DRX configuration, wherein the DRX configuration indicates configuration information on a DRX mode of the network device.

11. The network device of claim 10, wherein the DRX configuration and the DTX configuration are transmitted in a same message.

12. The network device of claim 9, wherein the DRX configuration includes uplink occasions at which the terminal device should not perform an uplink transmission.

13. The network device of claim 9, wherein the DTX configuration is specific to a cell that serves the terminal device.

14. The network device of claim 9, wherein the one or more processors are further configured, with the one or more transceivers, to cause the network device to perform the downlink transmission by causing the network device to perform:
    transmitting an uplink grant on a physical downlink control channel (PDCCH) in response to the scheduling request, wherein the scheduling request is triggered in association with a beam failure recovery report.

15. A method performed by a terminal device, the method comprising:
    receiving, from a network device, a discontinuous transmission (DTX) configuration, wherein the DTX configuration indicates configuration information on a DTX mode of the network device;
    transmitting, to the network device, a scheduling request following a discontinuous reception (DRX) configuration of the network device, wherein the scheduling request is associated with a beam failure recovery report; and
    within a predetermined time period after the transmitting the scheduling request, monitoring a physical downlink control channel (PDCCH) from the network device based on one or more conditions regardless of the DTX configuration, wherein the one or more conditions comprises a condition that a scheduling request is transmitted.

16. A method performed by a network device, the method comprising:
    transmitting, to a terminal device, a discontinuous transmission (DTX) configuration, wherein the DTX configuration indicates configuration information on a DTX mode of the network device;
    receiving, from the terminal device, a scheduling request which follows a discontinuous reception (DRX) configuration of the network device; and
    performing, during a sleeping time of the network device, according to the DTX configuration, a downlink transmission to the terminal device based on one or more conditions regardless of the DTX configuration wherein the one or more conditions comprises a condition that a scheduling request is transmitted.

17. A network device comprising:
    one or more processors; and
    one or more transceivers communicatively coupled to the one or more processors, wherein the one or more processors are configured, with the one or more transceivers, to cause the network device to perform at least:
    transmitting, to a terminal device, a discontinuous transmission (DTX) configuration, wherein the DTX configuration indicates configuration information on a DTX mode of the network device;
    receiving, from the terminal device, a scheduling request which follows a discontinuous reception (DRX) configuration of the network device, wherein the scheduling request is triggered in association with a beam failure recovery report; and
    performing a downlink transmission of an uplink grant on a physical downlink control channel (PDCCH) to the terminal device based on one or more conditions regardless of the DTX configuration, wherein the one or more conditions comprises a condition that a scheduling request is transmitted.

18. A method carried out by a network device, the method comprising:
    transmitting, to a terminal device, a discontinuous transmission (DTX) configuration, wherein the DTX configuration indicates configuration information on a DTX mode of the network device;
    receiving, from the terminal device, a scheduling request which follows a discontinuous reception (DRX) configuration of the network device, wherein the scheduling request is triggered in association with a beam failure recovery report; and
    performing a downlink transmission of an uplink grant on a physical downlink control channel (PDCCH) to the terminal device based on one or more conditions regardless of the DTX configuration, wherein the one or more conditions comprises a condition that a scheduling request is transmitted.

* * * * *